United States Patent [19]

Mitacek et al.

[11] Patent Number: 5,298,581

[45] Date of Patent: Mar. 29, 1994

[54] SHEET-LIKE ARTICLES FROM ORIENTABLE POLYMERS AND POLYMER MICROBEADS

[75] Inventors: Paul Mitacek; Anne M. Fischer; Dennis E. Smith, all of Rochester, N.Y.

[73] Assignee: Eastman Kodak Company, Rochester, N.Y.

[21] Appl. No.: 925,004

[22] Filed: Aug. 5, 1992

[51] Int. Cl.$^5$ .............................. C08F 4/32; B32B 5/16
[52] U.S. Cl. .................................. 526/232; 428/327; 428/402; 428/480; 428/910; 526/232.1
[58] Field of Search ............... 428/304.4, 314.2, 315.5, 428/327, 910, 480; 526/232, 232.1

[56] References Cited

U.S. PATENT DOCUMENTS

| | | | |
|---|---|---|---|
| 4,469,862 | 9/1984 | Komai et al. | 528/271 |
| 4,994,312 | 2/1991 | Maier et al. | 428/36.5 |
| 5,100,862 | 3/1992 | Harrison et al. | 503/227 |
| 5,143,765 | 9/1992 | Maier et al. | 428/36.5 |
| 5,156,905 | 10/1992 | Bagrodia et al. | 428/224 |

OTHER PUBLICATIONS

Sheppard & Kamath—"Selection and Use of Free Radical Initiators", *Polymer Engineering & Science,* Jul. 1979, vol. 19, No. 9.

*Primary Examiner*—Paul J. Thibodeau
*Assistant Examiner*—H. Thi Le
*Attorney, Agent, or Firm*—Robert A. Gerlach

[57] ABSTRACT

A sheet-like article comprising a continuous oriented polymer phase having dispersed therein from about 5–50% by weight of cross-linked polymeric microparticles based on the weight of the oriented polymer, the microparticles being partially bordered by void space, the void space occupying about 2 to 60% by volume of the sheet-like article, the cross-linked polymeric microparticles having been prepared by the free radical polymerization of an ethylenically mono-unsaturated monomer and an ethylenically poly-unsaturated monomer in the presence of an effective amount of diacyl peroxide to catalyze the reaction.

8 Claims, No Drawings

SHEET-LIKE ARTICLES FROM ORIENTABLE POLYMERS AND POLYMER MICROBEADS

BACKGROUND OF THE INVENTION

1. Field of the Invention

The present invention relates to sheet-like articles having an oriented polymer continuous phase and polymer microbeads dispersed therein that are at least partially bordered by voids. These articles have unique properties of texture, opaqueness, whiteness in the absence of colorants, and generally good physical properties such as thermal stability, durability, low density and the like. They are especially suitable for paper substitutes. More particularly, the invention relates to oriented polymer sheet like materials, the orientation of which requires lower physical forces, while at the same time providing sheet-like articles having lower density, higher opacity and lightness and lower yellowness.

2. Description of Related Art

U.S. Pat. No. 4,994,312 issued Feb. 19, 1991 to L. K. Maier et al. and assigned to the same assignee as the present invention relates to shaped articles including films and sheets from a matrix orientable polymer containing cross-linked microbeads which upon orientation of the matrix polymer causes microvoids. The microbeads are prepared utilizing VAZO 52, 2,2'-azobis-(2,4-dimethylpentane nitrile), a monomer soluble initiator sold by DuPont, as the initiator for the polyaddition reaction.

Free radical initiators are generally of two classes. See, for example, "The Selection and Use of Free Radical Initiators" by Chester S. Sheppard and Vasanth Kamath published in *Polymer Engineering and Science*, July 1979, Volume 19, No. 9. These two classes are peroxide compounds and azo compounds.

SUMMARY OF THE INVENTION

The invention contemplates a sheet-like article comprising a continuous oriented polymer phase having dispersed therein from about 5 to about 50 weight percent of cross-linked microparticles based on the weight of the oriented polymer said microparticles being partially bordered by a void space where the void space occupies from about 2 to about 60% by volume of the sheet-like article, the polymeric microparticles having been formed by the free radical polymerization of ethylenically unsaturated monomers in the presence of an effective amount of a diacyl peroxide to catalyze the reaction. It was unexpectedly found that by utilizing such peroxides as the free radical initiator in the preparation of the polymer microparticles, less force is required to stretch the sheet at the same temperature or the same force can be employed to stretch the sheet at a lower temperature than the prior art method and also that the resulting oriented films exhibited lower densities, higher opacities, higher lightness value and improved yellowness.

DESCRIPTION OF THE PREFERRED EMBODIMENTS

The cross-linked microparticles utilized in this invention as the voiding agents for the thermoplastic matrix material are copolymers prepared from an ethylenically mono-unsaturated monomer and an ethylenically poly-unsaturated monomer. The microparticles have a size of from about 0.1 to 50 micrometers preferably from about 1 to about 20 micrometers. The polyaddition reaction between the reactive components is conducted in the presence of a catalytic amount of a diacyl peroxide and any suitable technique for carrying out this reaction can be employed. Such techniques include melt polymerization, solvent polymerization, suspension polymerization, and limited coalescence and the like. Suspension polymerization and limited coalescence are the preferred methods of preparation limited coalescence being most preferred as it achieves more uniform particle size.

Where the reaction is conducted by a technique that does not inherently result in suitably sized microparticles, size reduction techniques are employed, such as, for example, grinding, dissolution followed by precipitation by the addition of a nonsolvent, dispersing the molten polymer in a nonsolvent such as water, spray drying a solution of the polymer in a volatile solvent, and the like. Such particle forming techniques are widely known in the art. U.S. Pat. Nos. 3,586,654; 3,847,886 and 4,833,060 are illustrative of such techniques and are each incorporated herein by reference.

U.S. Pat. Nos. 2,934,530; 3,615,972; 2,932,629; 4,314,932 and 4,994,312 are illustrative of the limited coalescence method and are each incorporated herein by reference.

Any suitable cross-linked copolymer may be used to make the microparticles by a polyaddition reaction in accordance with this invention. Suitable ethylenically mono-unsaturated monomers for the polyaddition reaction include, for example, styrene, methyl acrylate, methyl methacrylate, methacrylic acid, acrylic acid, butyl acrylate, acrylamide, acrylonitrile, vinyl toluene, vinyl pyridine, vinyl acetate, vinyl benzyl chloride, vinylidene chloride, acrylamidomethylpropane sulfonic acid, and the like. Suitable ethylenically poly-unsaturated monomers by a polyaddition reaction include, for example, divinyl benzene, ethylene glycol diacrylate, ethylene glycol dimethacrylate, butylene-glycol dimethacrylate and the like, The preferred cross-linked microparticles are a copolymer of styrene and divinyl benzene. More preferably, the polyaddition cross-linked microparticles are prepared using from about 40 percent by weight to about 95 percent by weight styrene and the balance divinyl benzene. Most preferably, styrene should be employed in an amount of 70 to 80 percent by weight by a limited coalescence process to prepare microbeads having a uniform particle size within the range of from about 1 to about 10 micrometers.

The products made in accordance with this invention are very durable. For example, when made into biaxially oriented films, the resultant synthetic papers are strong, ultra-white, highly-opaque, and long-lasting. Such papers are suitable for "archival" records and will retain their properties for very long periods of time, even when compared to the so-called "archival quality" papers of today. Not only are the synthetic papers of this invention extremely white, they are virtually free of the problem which plagues cellulose-based papers, i.e., "brightness reversion" or yellowing with time.

The products of this invention are environmentally desirable products. They are long lasting, durable, and recyclable. They can be made from "recycled" materials; e.g., poly(ethylene terephthalate) beverage bottles. Also, upon incineration, less than 1% ash and no undesirables such as chlorine, cyanides, etc. are found. Finally, if they are put into landfills, they will not make toxic gases or liquids, and they will not threaten the quality of our air or ground water.

The continuous phase polymer may be any thermoplastic polymer capable of being cast into a film or sheet and then oriented. Suitable classes of thermoplastic polymers include polyesters, polyolefins, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, and polysulfonates. Copolymers and/or mixtures of these polymers can also be used.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of a suitable amount o a co-acid component such as stilbene dicarboxylic acid. Examples of such liquid crystal copolyesters are those disclosed in U.S. Pat. Nos. 4,420,607; 4,459,402 and 4,468,510.

Suitable polyolefins include polyethylene, polypropylene, polymethylpentene, and mixtures thereof. Polyolefin copolymers, including copolymers of ethylene and propylene are also useful.

Useful polyamides are nylon 6, nylon 66, and mixtures thereof. Copolymers of polyamides are also suitable continuous phase polymers.

An example of a useful polycarbonates is bisphenol A polycarbonate.

Cellulosic esters suitable for use as the continuous phase polymer are cellulose nitrate, cellulose triacetate, cellulose diacetate, cellulose acetate propionate, cellulose acetate butyrate, and mixtures or copolymers thereof.

Useful polyvinyl resins include polyvinyl chloride, poly(vinyl acetal), and mixtures thereof. Copolymers of vinyl resins can also be utilized.

In the precipitation of microparticles for use in accordance with this invention, any suitable diacyl peroxide may be used in the polyaddition reaction such as, for example, dibenzoyl peroxide, di(2,4-dichlorobenzoyl) peroxide, diacetyl peroxide, dilauroyl peroxide, diisobutyl peroxide and the like. Benzoyl peroxide is preferred.

The catalyst is used in a catalytic amount to carry out the copolymerization of the ethylenically unsaturated monomers. Preferably, the catalyst is used in an amount of from about 0.05 to about 3.0 percent by weight, based on the weight of the reactants. Most preferably, the catalyst is used in an amount of from about 0.50 to about 2.5 percent by weight.

The shaped articles according to this invention are prepared by (a) forming a mixture of molten continuous matrix polymer and cross-linked polymer wherein the cross-linked polymer is a multiplicity of microparticles, preferably microbeads, uniformly dispersed throughout the matrix polymer, (b) forming a shaped article from the mixture by extrusion, casting or molding, (c) orienting the article by stretching to form microparticles (hereinafter referred to as "microbeads") of cross-linked polymer uniformly distributed throughout the article and voids at least partially bordering the microbeads on sides thereof in the direction, or directions of orientation. The advantage of employing the mirrobeads prepared as described above is observed in this stretching step as less force is required to accomplish the orientation.

The mixture may be formed by forming a melt of the matrix polymer and mixing therein the cross-linked polymer. The cross-linked polymer may be in the form of solid or semi-solid microbeads. Due to the incompatibility between the matrix polymer and cross-linked polymer, there is no attraction or adhesion between them, and they become uniformly dispersed in the matrix polymer upon mixing.

When the microbeads have become uniformly dispersed in the matrix polymer, a shaped article is formed. A film or sheet can be formed by extrusion or casting followed by orientation by stretching, at least in one direction. Methods of unilaterally or bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234, incorporated herein by reference.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred stretching operations simultaneously opens the microvoids and orients the matrix material.

The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

In general, void formation occurs independent of, and does not require, crystalline orientation of the matrix polymer. Opaque, microvoided films have been made in accordance with the methods of this invention using completely amorphous, non-crystallizing copolyesters as the matrix phase. Crystallizable/orientable (strain hardening) matrix materials are preferred for some properties like tensile strength and barrier. On the other hand, amorphous matrix materials have special utility in other areas like tear resistance and heat sealability. The specific matrix composition can be tailored to meet many product needs. The complete range from crystalline to amorphous matrix polymer is part of the invention.

The invention will be further illustrated by the following examples:

PREPARATION 1

Comparison

In a 500 gallon vessel is placed 410 kg of styrene, 177, kg of divinylbenzene, and 5.9 kg of Vazo 52, a monomer soluble initiator (DuPont). In a separate vessel is placed 830 kg of demineralized water, 423 g of potassium dichromate, 4.6 kg of poly(diethanolamine adipate), and 57 kg of Ludox TM (DuPont). The organic phase is added to the aqueous phase and stirred at 70 rpm to form an emulsion which is then homogenized at 5,000 psi. The homogenized mixture is heated to 42° C. overnight, cooled and the slurry sieved through a 400 mesh screen. The product is collected on a filtering centrifuge, rinsed with methanol on the centrifuge, and dried in a double cone rotary vacuum drive at 95° C. The dried beads are air classified using a Model MS-5 (Progressive Industries, Inc.) with the rotor set at 2650 rpm, air fan at 3,600 rpm, and 220 kg/hr feed rate to remove oversized particles.

PREPARATION 2

The above procedure is used except 10.57 kg Lucidol 70 (benzoyl peroxide from Pennwalt, 30% water wet) replaces the Vazo 52, the polymerization is run overnight at 65° C. instead of 42° C. and a 2 hour 95° C. cook is added after the overnight polymerization.

EXAMPLES 1 2 3 AND 4 GENERAL FILM PREPARATION TECHNIQUE

The dried, air classified microbeads of Preparations 1 and 2 (two samples of each) are compounded on a conventional twin screw extruder into a polyester to give 4 blends with a nominal 20 wt % loading; two employing polyethylene terephthalate having an I.V. of 0.71 and two an I.V. of 0.64. Each of the four blends is dried using standard conditions for 170°-180° C. convection with desiccated air for 4-6 hours. The blends are extruded on a conventional single screw extruder at a melt temperature of 265°-285° C. Films are cast through a standard coat hanger slit die onto a chill roll controlled to a temperature of 50°-60° C. yielding a film 20-30 mils thick. The films are stretched 3.3x biaxially and simultaneously using a standard laboratory film stretching unit. Stretched film thickness is nominally 3.3 mils. The maximum stress attained during stretching is calculated from the force readings on the laboratory stretching unit. Density is calculated from the weight and average of 5 thickness measurements on a 2" by 2" piece of film. CIELAB L* and b* values are measured using a Pacific Scientific spectrophotometer with UV light in, backed by black. Opacity is calculated from CIELAB values. The data as set forth in Table I demonstrates that the samples made with benzoyl peroxide initiator (Examples 1 and 2) exhibit lower densities, higher opacity, higher whiteness and lower yellowness than samples prepared using the same polyester and microbeads using the Vazo initiator (Examples 3 and 4).

| Ex-am-ple | Prep-aration 2 | Prep-aration 1 | PET I.V. | Stretch Temp (°C.) | Maximum Stress (kpsi) | Density (gm/cc) | Opacity (%) | L* | b* |
|---|---|---|---|---|---|---|---|---|---|
| 1 | x | | 0.71 | 105 | 5.3 | .76 | 83.7 | 90.4 | 0 |
| 2 | x | | 0.64 | 100 | 5.0 | .72 | 82.7 | 91.23 | −.37 |
| 3 | | x | 0.71 | 105 | 8.1 | .78 | 82.3 | 89.9 | .18 |
| 4 | | x | 0.64 | 100 | 7.1 | .80 | 79.8 | 89.8 | −.09 |

Also, the samples in accordance with the invention unexpectedly require less stress in tentering at the same stretching temperature.

It is to be understood that other diacyl peroxide can be used in like amounts throughout these examples in place of the specific initiator used to achieve like results and that other cross-linked polymers made using these initiators can be used in other thermoplastic films.

What is claimed is:

1. A sheet article comprising a continuous oriented polymer phase having dispersed therein from about 5-50% by weight of cross-linked polymeric microparticles based on the weight of the oriented polymer, the microparticles being partially bordered by void space, the void space occupying about 2 to 60% by volume of the sheet article, the cross-linked polymeric microparticles having been prepared by the free radical polymerization of an ethylenically mono-unsaturated monomer and an ethylenically poly-unsaturated monomer in the presence of an effective amount of a diacyl peroxide to catalyze the reaction.

2. The sheet article of claim 1 wherein the diacyl peroxide is present in the amount of from about 0.05 to about 3 percent by weight based on the weight of the unsaturated monomers.

3. The sheet article of claim 1 wherein the diacyl peroxide is dibenzoyl peroxide.

4. The sheet article of claim 1 wherein the ethylenically mono-unsaturated monomer is styrene.

5. The sheet article of claim 1 wherein the ethylenically poly-unsaturated monomer is divinylbenzene.

6. The sheet article of claim 1 wherein the continuous oriented polymer phase is a thermoplastic polymer.

7. The sheet article of claim 6 wherein the thermoplastic polymer is polyethylene terephthalate.

8. The sheet article of claim 2 wherein the diacyl peroxide is dibenzoyl peroxide, the ethylenically mono-unsaturated monomer is styrene, the ethylenically poly-unsaturated monomer is divinyl benzene and the continuous oriented polymer phase is polyethylene terephthalate.

* * * * *